United States Patent [19]
Tung

[11] 3,802,944
[45] Apr. 9, 1974

[54] RETROREFLECTIVE SHEETING
[75] Inventor: Chi Fang Tung, Lincoln, Minn.
[73] Assignee: Minnesota Mining & Manufacturing Company, St. Paul, Minn.
[22] Filed: Apr. 17, 1972
[21] Appl. No.: 244,837

[52] U.S. Cl. ............... 161/3.5, 40/130 B, 40/130 J, 40/132 R, 161/4, 161/83, 161/92, 161/410, 161/DIG. 5
[51] Int. Cl. ..................... G09f 13/16, G09f 13/06
[58] Field of Search ............. 161/3.5, 4, 83, 89, 92, 161/408–410, DIG. 5; 156/67; 40/130 B, 130 J, 132 R, 134

[56] References Cited
UNITED STATES PATENTS

| | | | |
|---|---|---|---|
| 2,130,704 | 9/1938 | Patzwaldt | 161/3.5 X |
| 2,354,018 | 7/1944 | Heltzer et al. | 161/DIG. 5 |
| 2,375,177 | 5/1945 | Reese | 156/67 |
| 2,716,082 | 8/1955 | Smith | 156/67 X |
| 2,874,729 | 2/1959 | Ball | 161/89 X |
| 2,950,222 | 8/1960 | Hinson | 156/67 |
| 3,155,764 | 11/1964 | Gill | 350/106 |
| 3,190,178 | 6/1965 | McKenzie | 161/408 X |
| 3,405,025 | 10/1968 | Goldman | 161/4 |
| 3,708,378 | 1/1973 | Tung | 161/410 X |
| 3,716,445 | 2/1973 | Lemelson | 161/4 X |
| 2,937,668 | 5/1960 | Carey et al. | 139/426 R |

*Primary Examiner*—Harold Ansher
*Attorney, Agent, or Firm*—Alexander, Sell, Steldt & DeLaHunt

[57] ABSTRACT

Retroreflective sheeting comprising (a) an open web of retroreflective strands, and (b) a layer of polymer-based material extending over at least part of a first side of the web and closing openings in the web. The polymer-based layer may be pigmented, and other elements of structure may be added to the basic retroreflective sheeting to produce other novel retroreflective articles.

15 Claims, 3 Drawing Figures

RETROREFLECTIVE SHEETING

The present invention provides a new kind of retroreflective sheeting useful in a variety of ways, both in itself and as a basic structural unit in other retroreflective sheeting.

Briefly, this new retroreflective sheeting comprises (a) an open web of retroreflective strands, a strand comprising a base filament encased by a monolayer of minute retroreflective microspheres, and (b) a layer of polymer-based material covering at least part of a first side of the web and closing openings in the web.

In one preferred embodiment, the polymer-based material is pigmented to make the layer of polymer-based material light-diffusing and light-transmissive, whereupon the sheeting is especially useful in illuminated retroreflective signs of the type described in my copending application, Ser. No. 220,152, filed Feb. 24, 1972, which is incorporated herein by reference. A typical sign described in that application comprises a light source, a light-diffusing panel covering the light source, a light-transmissive retroreflective sheeting such as an open web of retroreflective strands as described, but without the polymer-based layer, and a transparent front plate carrying a sign image. While such signs offer good brightness and reliability at night because of their joint retroreflectivity and internal illumination, interest in such signs is limited by the fact that the face of the sign has a strong unattractive metallic gray tint; this gray tint is caused by a metallic layer that underlies the microspheres to enhance reflectivity.

It has been found that a construction of the present invention significantly improves the color of a sign face as described, because of the presence of the pigmented polymer-based material that closes openings in the web of retroreflective strands. The close proximity of the pigmented polymer-based material to the metallic gray microspheres, and the blocking of portions of the sides and backs of the retroreflective strands by the pigmented polymer-based material, results in significant modification of the color of the sign to have more of the color of the pigmented polymer-based material.

Beside this use, retroreflective sheeting of the invention has many other uses, as will be discussed in more detail in the following teachings.

DETAILED DESCRIPTION

Figure 1:
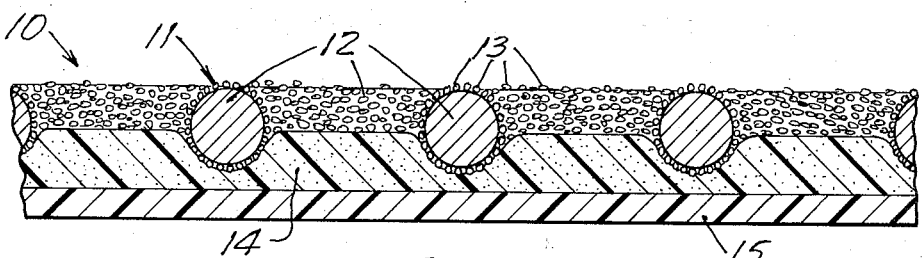
FIG. 1 is a section through part of an illustrative retroreflective sheeting of the invention.

The illustrative retroreflective sheeting 10 of the invention shown in FIG. 1 comprises an open-mesh fabric of retroreflective strands 11, each strand comprising a base filament 12 encased by a monolayer of minute retroreflective microspheres 13. A layer 14 of polymer-based material extends over a first side of the fabric, closing and partially filling the openings between the microsphere-encased filaments in the fabric (for purposes herein a web or fabric of retroreflective strands, itself, is considered "open" or "open-mesh" even though part or all of the openings are closed by polymer-based material). In the illustrated embodiment, the polymer-based layer 14 is pigmented so as to make the layer light-diffusing and light-transmissive, though for some retroreflective sheeting of the invention, the polymer-based layer is not pigmented. A support sheet 15 is attached to the bottom of the layer 14 of polymer-based material, this support sheet being an optional element useful during manufacture of the retroreflective sheeting and also providing physical protection for the polymer-based layer and mechanical support to the whole sheeting.

Figure 2:
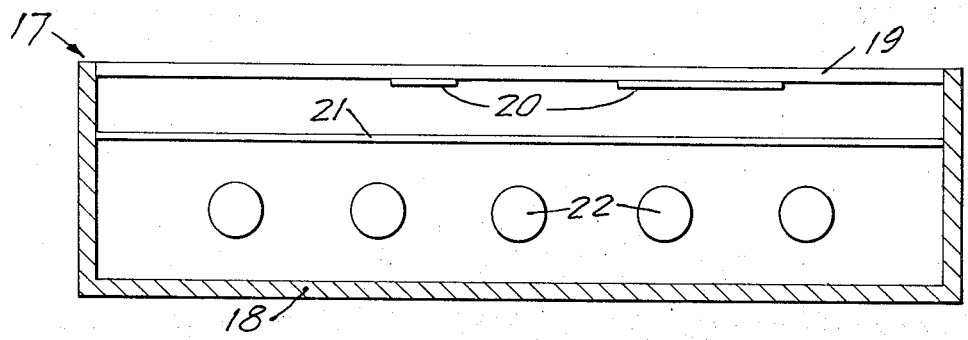
FIG. 2 is a section through an illustrative sign that incorporates retroreflective sheeting of the invention.

FIG. 2 illustrates a sign 17 that incorporates retroreflective sheeting such as shown in FIG. 1. The sign 17 comprises an open-sided box-like enclosure 18, a transparent front plate 19 covering the open side of the enclosure and carrying a sign image 20, light-transmissive light-diffusing retroreflective sheeting 21 of the invention, and a set of tubular lamps 22, such as neon or fluorescent lamps. When the lamps are lit, their light travels through the light-diffusing retroreflective sheeting 21 and through the transparent front plate 19 to make the image 20 on the front plate visible to viewers of the sign. At night when a light is beamed against the front plate 19, that light travels through the front plate, is retroreflected by the retroreflective light-diffusing sheeting 21, and returns along substantially the same path that it traveled to the sign to greatly enhance the brightness of the sign; and if the lamps 22 are for some reason not illuminated, such reflected light will make the sign image 20 visible to persons within the range of the reflected light.

A web of retroreflective strands useful in retroreflective sheeting of the invention is described in my above-mentioned copending application, Ser. No. 220,152. Such a retroreflective web typically comprises a fabric of interwoven base filaments (but may comprise only parallel filaments supported in an exterior frame, for example), a layer of binder material coated around the individual base filaments, and a monolayer of transparent microspheres or beads, each partially embedded and adhered in the binder material on the filaments. The embedded surfaces of the microspheres are preferably covered with a reflective material such as vapor-coated silver or aluminum.

The base filaments in a retroreflective web of the invention are made from a variety of materials, such as cellulose-based materials, synthetic polymers, or metal. And they are sometimes made of material that can be heat-formed, whereby the web of retroreflective strands is given a non-planar configuration. Such a configuration is useful, for example, when the sign face is three-dimensional. Metal filaments or other filaments that are electrically conductive and generate heat by passage of an electric current are useful in signs of the invention to keep the sign face free from condensed moisture or frost. In one advantageous construction of this type, a transparent front plate of a sign is laminated in slightly spaced relation to retroreflective sheeting of the invention that incorporates such conductive filaments. Or conductive filaments may be disposed between retroreflective sheeting of the invention and a transparent front plate to which the sheeting is laminated.

The binder material holding the microspheres to the base filaments is preferably elastomeric to permit the sheeting to be rolled, as for shipment, and to facilitate an otherwise easy handling of the sheeting. One such useful elastomer-forming binder material comprises a polyether polyamine of high amine functionality, such as poly(tetramethyleneoxide)diamine taught in Hubin, et al, U.S. Pat. No. 3,436,359, and diglycidyl ether of bisphenol A. This material cures to form a very strong bond with partially embedded silver- or aluminum-coated glass micropsheres. Other useful binder materials include natural rubber, acrylic resins, and polyvinyl butyral resins.

The web of retroreflective strands in retroreflective sheeting of the invention is chosen to have an amount of open area—that is, the area of spaces between the strands—that provides a desired balance of light-tansmission and reflection. Preferably, the web will transmit, prior to incorporation of a polymer-based layer of the invention, at least 20 percent, and more preferably at least 40 percent, of the light impinging on the web (the percent open area of a web of retrorelfective strands may be indicated by the amount of light-transmission through the web; the percent-transmission numbers are assumed to describe the percent open area of web, and the nontransmitting portions of the web are assumed to be retroreflective). On the other hand, so that the retroreflective sheeting of the invention will provide good retroreflection, the web will preferably transmit, prior to incorporation of a polymer-based layer of the invention, no more than 80 percent, and more preferably no more than 60 percent of light striking it. Adequate light-transmission and reflection can also be obtained with sheeting in which the web has a percentage of open area outside these ranges; for example, for some purposes, a web of retroreflective strands transmitting as little as 5 percent of the light impinging on it may be used, and a web transmitting as much as 90 or 95 percent of light has useful reflection characteristics.

A retroreflective sheeting of the invention is least noticeable in a sign of the invention when the openings in the web of retroreflective strands are very fine or small. Thus, the sheeting is least noticeable when the diameter of the retroreflective strands is less than 500 microns and preferably less than 250 microns, and when the smallest dimension of the spaces between the retroreflective strands is less than 1 millimeter, and preferably less than 500 microns. However, in sheeting for use in some signs of the invention and in sheeting intended for other uses, the size of the retroreflective strands and openings may be outside these ranges. Also, the fabric of base filaments from which the sheeting is prepared may be woven in a pattern such that some filaments are close together, while other filaments are spaced further apart. For example, the fabric may have a checkerboard pattern, such that after microspheres have been applied to the fabric, there are no openings between some adjacent retroreflective strands. And the encasing of microspheres for a particular strand may not extend around the whole base filament. The microspheres or beads are of a size such that a dense monolayer of them can be coated on the base filaments without unduly reducing the size of the spaces between the filaments.

One method for incorporating a web of retroreflective strands into retroreflective sheeting of the invention is to press the web into a preformed layer of polymer-based material that is flowable, either at room temperature or at an elevated temperature, and that will develop adhesion to the web. Desirably the polymer-based layer is carried during this operation on a support sheet, such as the sheet 15 shown in FIG. 1, or on a removable release liner; and the side of the web opposite from the polymer-based layer is covered with a sheet that either forms part of the final structure or is removable.

By changing the process parameters, such as the amount of pressure applied, the thickness of the layer of polymer-based material before the web of retroreflective strands is pressed against it, the flowability of the material, or the temperature of the pressing operation, the degree to which the polymer-based material fills the openings in the web can be varied from a very slight amount to a very large amount. In the embodiment shown in FIG. 1, portions of the polymer-based layer fill approximately half of each of the openings between the retroreflective strands, and this amount of filling has been found to represent a desirable compromise between two factors: The more filling of the openings between the retroreflective strands, the better the color of retroreflective sheeting having a pigmented polymer-based layer. On the other hand, the more filling of the openings by pigmented material, the less bright will be the retroreflection of light that strikes the sheeting at an angle other than normal to the sheeting.

Figure 3:
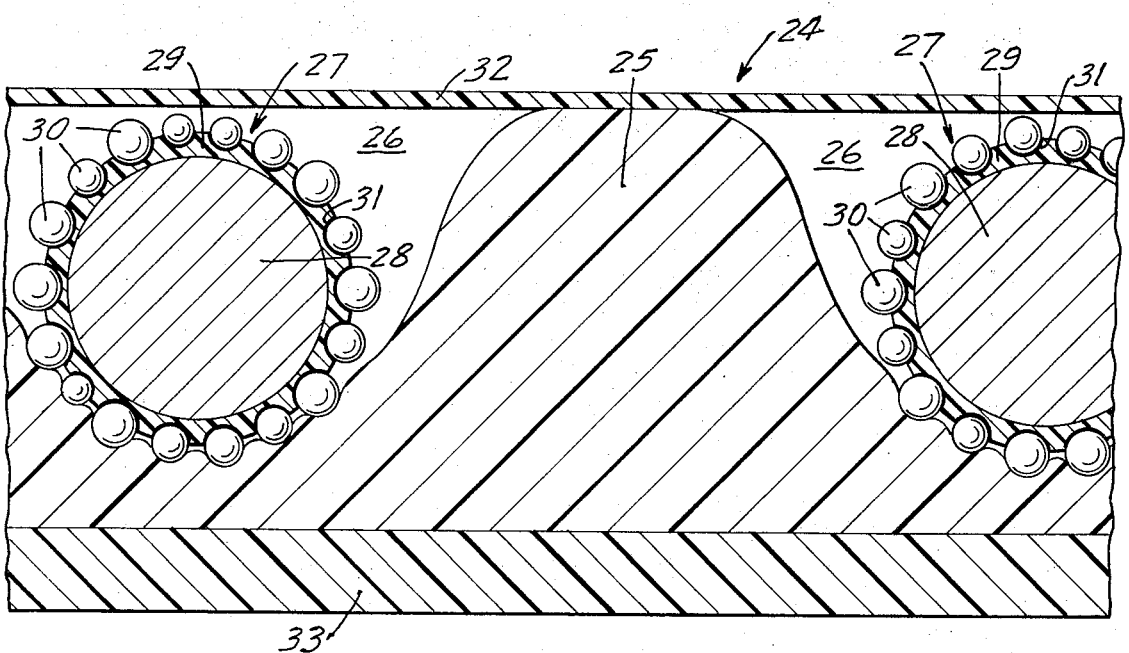
FIG. 3 is a section through part of a different illustrative retroreflective sheeting of the invention.

FIG. 3 shows a retroreflective sheeting 24 of the invention in which there is a very large amount of penetration of polymer-based material 25 through openings 26 in a web of retroreflective strands 27, the strands comprising a base filament 28, a layer 29 of binder material coated on the filament, and a monolayer of microspheres 30 partially embedded and adhered in the layer of binder material; a layer 31 of reflective material underlies the microspheres. Sufficient polymer-based material penetrates through the openings to engage and adhere a transparent sheet 32 to the side of the web of filaments opposite from the side carrying the polymer-based layer, which is supported on a support sheet 33. One purpose for a construction as shown in FIG. 3 is to make a retroreflective sheeting that is useful both when a layer of water covers the exterior surface of the sheeting and when the sheeting is dry. To obtain the desired results, the sheet 32 should be in slightly spaced relation to the web of retroreflective strands, as shown in FIG. 3, so that the microspheres 30 are exposed to air, thus causing light rays to be refracted the amount needed for the microspheres to be reflective. The amount of spacing between the microspheres and sheet may be very small, as small as a molecular layer of air.

The polymer-based layer in a retroreflective sheeting of the invention may be pigmented as in the embodiment of FIG. 1; or it may be unpigmented, as in the embodiment shown in FIG. 3 or as in retroreflective sheeting in which a support sheet as shown in FIGS. 1 or 3 is itself light-diffusing. When pigmented, the polymer-based material may be pigmented in a variety of colors to give different effects as desired. Phosphorescent or fluorescent pigments may also be used for special effects. Sufficient pigment is included in the polymer-based layer in a light-diffusing retroreflective sheeting as shown in FIG. 1 to obtain the desired degree of light-diffusion and light-transmission. Typically, light-diffusing panels used in illuminated signs transmit about 50 percent of the light striking them. The amount of light-transmission can also be controlled by changing the thickness of the pigmented polymer-based layer. Other means to make the layer of polymer-based material light-diffusing and light-transmissive can also be used, as by foaming the layer.

A variety of polymer-based materials may be used in retroreflective sheeting of the invention. For the method for making retroreflective sheeting of the invention described above, a pressure-sensitive adhesive polymer such as the acrylate polymers described in Ulrich, U.S. Pat. No. Re. 24,906, are useful. Such materials exhibit tackiness and flow properties such that, after they have been coated onto a support sheet, a web of retroreflective filaments may be readily pressed into the layer to produce a structure such as shown in FIG. 1. Other polymers are also used, however, such as heat-softenable polymers into which the web of filaments can be pressed in the presence of heat. It is desirable that the polymer-based material have elastomeric properties so as to permit convenient handling of the sheeting.

If polymer-based material of standard indices of refraction are coated in contact with the exposed surface of microspheres on filaments in a sheeting of the invention, the microspheres will not retroreflect light impinging on them. This fact is useful to provide retroreflective sheeting capable of special effects. For example, if the front side (that side that receives light for reflection) of a retroreflective web of the invention to be used in an illuminated sign is coated with transparent polymer-based material in a pattern providing graphic information, the graphic information will not be visible during the day time, but will be visible at night when light is beamed against the sign. Thus special speed limits to take effect at night may be made visible at the time needed.

In another useful retroreflective sheeting of the invention, additional microspheres are partially embedded in the surface of polymer-based material between retroreflective strands. In this way microspheres of different indices of refraction may be used, the microspheres on the base filaments having an index of refraction useful for reflecting light when dry, for example, and the microspheres embedded in the polymer-based material having an index of refraction useful for reflecting light when wet. Glass microspheres of these different indices of refraction are also of different density, and this fact makes it difficult to use known coating procedures for preparing retroreflective sheeting that carries a layer of both kinds of microspheres. By the present invention, it is practical to prepare sheeting carrying both kinds of microspheres. In other embodiments of the inention, different materials may be coated on the polymer-based material to produce different useful effects.

The invention will be further illustrated by the following examples.

EXAMPLE 1

A fabric of 200-micron-diameter nylon filaments woven in a straight "Leno" weave using 20 filaments per inch was first roller-coated with a primer to fill up all crevices in the filament. The primer material was a 10-weight-percent-solids solution in toluene of the following ingredients:

| | Parts by Weight |
|---|---|
| Poly(tetramethyleneoxide)diamine that has a number-average molecular weight of 10,000, an amine equivalent weight of 4610, and a viscosity at 65°C of 49,500 centipoises, and that was prepared according to the procedures of Examples 1–4 of Hubin et al., U.S. Pat. 3,436,359 | 100 |
| 2,4,6-tris-dimethylaminomethylphenyl catalyst (DMP-30) | 2.5 |
| Diglycidyl ether of bisphenol A having an epoxide equivalent weight of 180–195 (Epon 828) | 50 |
| Stannous octoate catalyst | 5 |

This primer coating was then cured at 150°F for 30 minutes. After the fabric had cooled to room temperature, a binder material of the same ingredients listed above but dissolved at 30-weight-percent solids in toluene was coated on the fabric, after which the coated fabric was exposed to jets of compressed air to remove excess binder material and keep the spaces between filaments open. While the layer of binder material was still wet and tacky, the fabric was passed through a "fluidized bed" of silver-coated glass microspheres 37 to 88 microns in diameter (the fabric passed over a trough containing microspheres that were shot upward by a set of compressed air nozzles at the bottom of the trough, with a canopy above the fabric returning the microspheres toward the fabric), whereupon the filaments of the fabric became individually encased by a densely packed monolayer of microspheres adhered to and partially embedded in the coating of binder material. The layer of binder material was then cured at 150°F for 1 hour, after which the silver on the exposed portions of the microspheres was removed by etching with an acidic solution. was removed by etching with an acidic solution.

The resulting light-transmissive retroreflective sheeting had an open area of about 50 percent (determined by measuring the light in photovolt units (PV) returned by an assembly that comprised the sheeting before the silver was removed (which is known to have a PV of zero) over a standard sheeting known to have a PV of 57 using a photometer that has been calibrated with the standard 57 PV sheeting; the assembly was measured as having a PV of 30, meaning that the percent open area of the light-transmissive sheeting of this example was 30/57 times 100 percent, or about 50 percent).

Pigment-grade titanium dioxide was then dispersed in isopropanol in a ratio of 50 weight-percent titanium dioxide and 50 weight-percent isopropanol. A 20-weight-percent-solids solution in heptane of a copolymer of iso-octyl acrylate and acrylic acid was then mixed with the pigment dispersion in a high speed blender in a ratio of 20 weight-percent of the dispersion and 80 weight-percent of the solution.

The resulting mixture was coated onto a one-mil-thick polyethylene terephthalate film in an amount providing a 6-mil-thick wet coating, after which the coating was dried for 15 minutes at 150°F, or until the solvent evaporated. The microsphere-encased fabric described above was then laid over the dried coating and gently squeezed against the coating with a rubber roller. A one-half-mil-thick polyethylene terephthalate film serving as a removable cover sheet was then laid over the exposed side of the microsphere-encased fabric, and the complete assembly laid in a vacuum applicator, which comprises a perforated support table, a hinged rubber diaphragm that is pivotable into place over the perforated table so that the table and diaphragm form a vacuum chamber, and a hinged cover carrying a set of heat lamps that is pivotable into place over the rubber diaphragm. The assembly was arranged so that the back side of the assembly was against the rubber diaphragm. A vacuum of about 25 inches of mercury was then drawn while the assembly was heated to and held at 250°F for 1 minute. The assembly was then removed from the applicator and the cover sheet removed, leaving a retroreflective sheeting as illustrated in FIG. 1.

EXAMPLE 2

The above procedure was repeated, except that no pigment was mixed into the solution of acrylate polymer, sufficient of the solution of acrylate polymer was coated to provide a 50-mil-thick wet coating, and the top side of the assembly was placed against the rubber diaphragm. Upon completion of the process, a retroreflective sheeting as shown in FIG. 3 had been prepared, except that the top transparent sheet, while spaced from the retroreflective strands, conformed to the strands.

What is claimed is:

1. Retroreflective sheeting comprising (a) an open web of filaments that are encased around their whole circumference at least over those parts of their length that define open spaces of the web by a monolayer of minute retroreflective microspheres, and (b) a layer of polymer-based material extending over at least part of a first side of the web and closing openings of the web.

2. Retroreflective sheeting of claim 1 in which the polymer-based material is pigmented so that the layer of polymer-based material is light-diffusing and light-transmissive.

3. Retroreflective sheeting of claim 1 in which a transparent sheet is laminated in slightly spaced relation to the second side of the web and is held to the web by portions of the polymer-based material that extend from the first side through the openings of the web into contact with the transparent sheet.

4. Retroreflective sheeting of claim 1 in which the filaments are interwoven so that they form an open-mesh fabric.

5. Retroreflective sheeting of claim 1 in which the polymer-based material is pigmented with a phosphorescent or fluorescent pigment.

6. Retroreflective sheeting of claim 1 in which additional retroreflective microspheres are partially embedded in the surface of the polymer-based material between the microsphere-encased filaments.

7. Retroreflective sheeting comprising (a) an open-mesh fabric of filaments that are encased around their whole circumference at least over those parts of their length that define the open meshes of the fabric by a monolayer of minute retroreflective microspheres, and the spaces between the microsphere-encased filaments occupying between 20 and 80 percent of the area covered by the fabric; and (b) a continuous layer of polymer-based material extending over at least part of a first side of the fabric and closing openings of the fabric.

8. Sheeting of claim 7 in which the polymer-based material is pigmented so as to make the layer of polymer-based material light-diffusing and light-transmissive.

9. Sheeting of claim 7 in which the microsphere-encased filaments have a diameter less than about 500 microns.

10. Sheeting of claim 7 in which the smallest dimension of the spaces between the microsphere-encased filaments is less than 1 millimeter.

11. Retroreflective sheeting of claim 7 in which a transparent sheet is laminated in slightly spaced relation to the second side of the fabric and is held to the fabric by portions of the polymer-based material that extend from the first side through the openings of the fabric into contact with the transparent sheet.

12. Retroreflective sheeting comprising (a) an open-mesh fabric of filaments that are encased around their whole circumference at least over those parts of their length that define the open meshes of the fabric by a monolayer of minute retroreflective microspheres, the microspheres being partially embedded in a layer of binder material coated on the filaments after the filaments have been woven into a fabric, the spaces between the microsphere-encased filaments occupying between 20 and 80 percent of the area covered by the fabric; and (b) a continuous layer of polymer-based material extending over at least part of a first side of a fabric and closing openings of the fabric.

13. Sheeting of claim 12 in which the microsphere-encased filaments have a diameter less than 500 microns and the smallest dimension of the spaces between the microsphere-encased filaments is less than 1 millimeter.

14. Sheeting of claim 12 in which the binder material in which the microspheres are partially embedded is an elastomeric material.

15. Sheeting of claim 14 in which the elastomeric material comprises epoxy resin and a water-insoluble polyether polyamine of high amine functionality.

* * * * *